United States Patent
Kamani et al.

(10) Patent No.: US 12,106,268 B2
(45) Date of Patent: *Oct. 1, 2024

(54) SYSTEM AND METHOD FOR DETECTION AND VALIDATION OF ELECTRONIC DATA FEEDS

(71) Applicant: Walmart Apollo, LLC, Bentonville, AR (US)

(72) Inventors: Prakash Kamani, Bangalore (IN); Mohammad Tariq, Bangalore (IN); Kavita Sadar, Bangalore (IN); Daljeet Singh, Bangalore (IN); Dinesh Singla, Bangalore (IN); Shantanu Preetam, Baganlore (IN); Alekhya Ganan, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 376 days.

This patent is subject to a terminal disclaimer.

(21) Appl. No.: 17/504,286

(22) Filed: Oct. 18, 2021

(65) Prior Publication Data

US 2022/0051187 A1    Feb. 17, 2022

Related U.S. Application Data

(63) Continuation of application No. 16/534,528, filed on Aug. 7, 2019, now Pat. No. 11,176,517.

(30) Foreign Application Priority Data

Aug. 7, 2018 (IN) .............................. 201811029690

(51) Int. Cl.
*G06F 16/215*     (2019.01)
*G06Q 10/0875*   (2023.01)
(Continued)

(52) U.S. Cl.
CPC ....... *G06Q 10/0875* (2013.01); *G06F 16/215* (2019.01); *H04L 51/046* (2013.01); *G06F 16/2365* (2019.01)

(58) Field of Classification Search
None
See application file for complete search history.

(56) References Cited

U.S. PATENT DOCUMENTS 5,740,425 A    4/1998  Povilus
6,866,194 B2   3/2005  Scheurer
(Continued)

OTHER PUBLICATIONS

International Search Report and Written Opinion mailed Oct. 22, 2019 in corresponding International Application No. PCT/US2019/045516.

(Continued)

*Primary Examiner* — Yu Zhao
(74) *Attorney, Agent, or Firm* — Morgan, Lewis & Bockius LLP; Manita Rawat (57) ABSTRACT

A method includes receiving an electronic feed inventory file; creating a feed message including a batch of inventory messages based on the feed inventory file; placing the feed message in a message queue; performing validation of each of the inventory messages; generating a response to each invalid inventory messages; generating a first batch of response message including the responses to the invalid inventory messages; publishing the first batch of response message to the message queue; updating a first database based on validated inventory messages; generating responses to each of the validated inventory messages; generating a second batch of response message including the responses to the validated inventory messages, the first and second batch of response message having the batch identification; publishing the second batch of response message to (Continued)

the message queue; and updating a second database based on the first and second batch of response messages.

20 Claims, 5 Drawing Sheets

Related U.S. Application Data (60) Provisional application No. 62/773,657, filed on Nov. 30, 2018.

(51) Int. Cl.
*H04L 51/046* (2022.01)
*G06F 16/23* (2019.01)

(56) References Cited

U.S. PATENT DOCUMENTS

| | | | |
|---|---|---|---|
| 7,050,995 B2 * | 5/2006 | Wojcik | G06Q 30/0601 |
| | | | 705/14.1 |
| 7,113,920 B1 | 9/2006 | Brisiel et al. | |
| 7,222,786 B2 | 5/2007 | Renz et al. | |
| 7,574,383 B1 | 8/2009 | Parasnis et al. | |
| 7,660,753 B2 | 2/2010 | Sakuma et al. | |
| 7,860,757 B2 | 12/2010 | Cotton et al. | |
| 7,908,221 B2 | 3/2011 | Bodmer et al. | |
| 8,224,680 B2 | 7/2012 | Parisien et al. | |
| 8,521,614 B1 * | 8/2013 | Yalamanchi | G06Q 30/06 |
| | | | 705/27.1 |
| 8,566,137 B1 | 10/2013 | Cabrera et al. | |
| 9,563,870 B1 | 2/2017 | Szmajda et al. | |
| 9,990,612 B2 | 6/2018 | Brooks et al. | |
| 10,040,631 B2 | 8/2018 | Shakes et al. | |
| 2003/0004971 A1 | 1/2003 | Gong et al. | |
| 2004/0199536 A1 | 10/2004 | Barns Leon et al. | |
| 2006/0085293 A1 * | 4/2006 | Melucci | G06Q 10/087 |
| | | | 705/28 |
| 2006/0149641 A1 | 7/2006 | Loeb et al. | |
| 2006/0190290 A1 | 8/2006 | Gomez | |
| 2007/0262142 A1 | 11/2007 | Whitehouse et al. | |
| 2010/0316470 A1 * | 12/2010 | Lert | B65G 1/065 |
| | | | 414/807 |
| 2011/0202500 A1 | 8/2011 | Warn et al. | |
| 2015/0169726 A1 | 6/2015 | Karn et al. | |
| 2017/0068788 A1 | 3/2017 | Cannady et al. | |
| 2017/0220985 A1 | 8/2017 | White et al. | |

OTHER PUBLICATIONS

"Centralized Inventory Management across Flipkart, Snapdeal, Amazon etc.", Browntape, pp. 1-3.
"E-commerce Multichannel Solutions", SellerActive, pp. 1-5.
"Inventory Management Problems?", Shopify, pp. 1-5.

* cited by examiner

SYSTEM AND METHOD FOR DETECTION AND VALIDATION OF ELECTRONIC DATA FEEDS

CROSS-REFERENCE TO RELATED APPLICATIONS

This patent application is a continuation application of and claims priority to U.S. patent application Ser. No. 16/534,528, filed Aug. 7, 2019 and entitled "SYSTEM AND METHOD FOR ANOMALY DETECTION AND DEDUPLICATION OF ELECTRONIC DATA FEEDS," and further claims priority to Indian Provisional Application No.: 201811029690, filed Aug. 7, 2018, and U.S. Provisional Application No. 62/773,657, filed Nov. 30, 2018, the entire contents of each of which are incorporated by reference herein in their entirety.

BACKGROUND

1. Technical Field

The present disclosure relates to electronic data feeds, and more specifically to systems and methods for anomaly detection and deduplication data in electronic data feeds.

2. Introduction

With the growth of eCommerce, the number of interaction points from vendors (e.g., suppliers and sellers) is continuously increasing. This may include a high volume of inventory transaction interactions between eCommerce systems and vendors. Due to the increase of eCommerce players in the market, vendors may continuously strive to increase their footprint by engaging multiple eCommerce sites to sell their stock across the sites of the multiple eCommerce players. Each of the sites should have the latest updated inventory count for each item. This will ensure the customer is actually able to purchase items and receive an accurate shipping date. To achieve this, vendors may replay all of their transactions to each of the eCommerce sites, irrespective of the site which has actually conducted the transacted the inventory. In addition, vendors may rebroadcast the inventory for all the items of the vendors over a specified interval to remove any anomalies in the interactions across sites.

There is a need for systems and methods to reduce or eliminate duplicate data in electronic data feeds and between different inventory databases, the rebroadcasting of the same data in electronic feeds across networks to different inventory systems, and to eliminate anomalies in the data. This will improve the speed and efficiency of the systems for inventory storage and update.

SUMMARY

In an exemplary embodiment of the invention, a system may comprise a feed gateway. The feed gateway may be configured to: receive a feed inventory file; create, based on the feed inventory file, a feed message, wherein: the feed message may include a batch of inventory messages having a batch identification; each of the inventory messages may correspond to one stock keeping unit (SKU) of a batch of SKUs; and the inventory message corresponding to the one SKU may include inventory update information of the one SKU and lead days of the one SKU; and publish the feed message to a messaging management unit. The messaging management unit (MMU) may be configured to: receive the feed message from the feed gateway; place the feed message in a message queue of the MMU; and send the feed message from the message queue to an inventory management system (IMS) unit. The IMS unit may be configured to: receive the feed message from the message queue of the MMU; perform validation one each of the inventory messages; generate a response to each of inventory messages that are invalidated; generate a first response message including the responses to the inventory messages that are invalidated, the first response message having the batch identification; publish the first response message to the MMU; update a database of the IMS based on inventory messages that are validated; generate a responses to each of the inventory messages that are validated; generate a second response message including the responses to the inventory messages that are validated, the second response message having the batch identification; and publish the second message to the MMU. The MMU may be further configured to: receive the first response message from the IMS; place the first response message in the message queue of the MMU; send the first response message to the feed gateway; receive the second response message from the IMS; place the second response message in the message queue of the MMU; and send the second response message to the feed gateway. The feed gateway may be further configured to: receive the first response message from the MMU; receive the second response message from the MMU; and update a database of the feed gateway based on the first response and second response messages.

In an exemplary embodiment of the invention, a method for performing concepts disclosed herein can include: receiving a feed inventory file; creating a feed message based on the feed inventory file, wherein: the feed message includes a batch of inventory messages having a batch identification; each of the inventory messages corresponds to one stock keeping unit (SKU) of a batch of SKUs; and the inventory message corresponding to the one SKU includes inventory update information of the one SKU and lead days of the one SKU; placing the feed message in a message queue; performing validation one each of the inventory messages; generating a response to each of inventory messages that are invalidated; generating a first response message including the responses to the inventory messages that are invalidated, the first response message having the batch identification; publishing the first response message to the message queue; updating a first database based on inventory messages that are validated; generating a responses to each of the inventory messages that are validated; generating a second response message including the responses to the inventory messages that are validated, the second response message having the batch identification; publishing the second response message to the message queue; and updating a second database based on the first response and second response messages.

In an exemplary embodiment of the invention, a non-transitory computer-readable storage medium configured as disclosed herein can have instructions stored which, when executed by a computing device, cause the computing device to perform operations which include: receiving a feed inventory file; creating a feed message based on the feed inventory file, wherein: the feed message includes a batch of inventory messages having a batch identification; each of the inventory messages corresponds to one stock keeping unit (SKU) of a batch of SKUs; and the inventory message corresponding to the one SKU includes inventory update information of the one SKU and lead days of the one SKU;

placing the feed message in a message queue; performing validation one each of the inventory messages; generating a response to each of inventory messages that are invalidated; generating a first response message including the responses to the inventory messages that are invalidated, the first response message having the batch identification; publishing the first response message to the message queue; updating a first database based on inventory messages that are validated; generating a responses to each of the inventory messages that are validated; generating a second response message including the responses to the inventory messages that are validated, the second response message having the batch identification; publishing the second response message to the message queue; and updating a second database based on the first response and second response messages.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Systems, methods, and computer-readable storage media configured according to this disclosure may be capable of anomaly detection and deduplication of electronic data feeds. Although described below in the context of eCommerce, embodiments of the invention are equally applicable in other contexts. As mentioned, inventory transactions may be duplicated in more than one interactions between vendors and eCommerce sites. That is, the item inventory may not change between one or more interactions between the vendors and the eCommerce sites. Such duplication may result in computing resource inefficiency and slower processing of transactions. In addition, anomalies may occur in item inventory feed. The anomalies may include item inventory feed may have missing mandatory attributes, and that data length for attribute of entries of item inventory feed may be more than a specified limit. Systems, methods, and computer-readable storage media configured according to this disclosure may resolve at least the above-mentioned problems. For example, based on the systems and methods disclosed herein, 70% of an electronic inventory data feed may be identified as rebroadcast feed, thus substantially reducing computing resource consumption.

Figure 1:
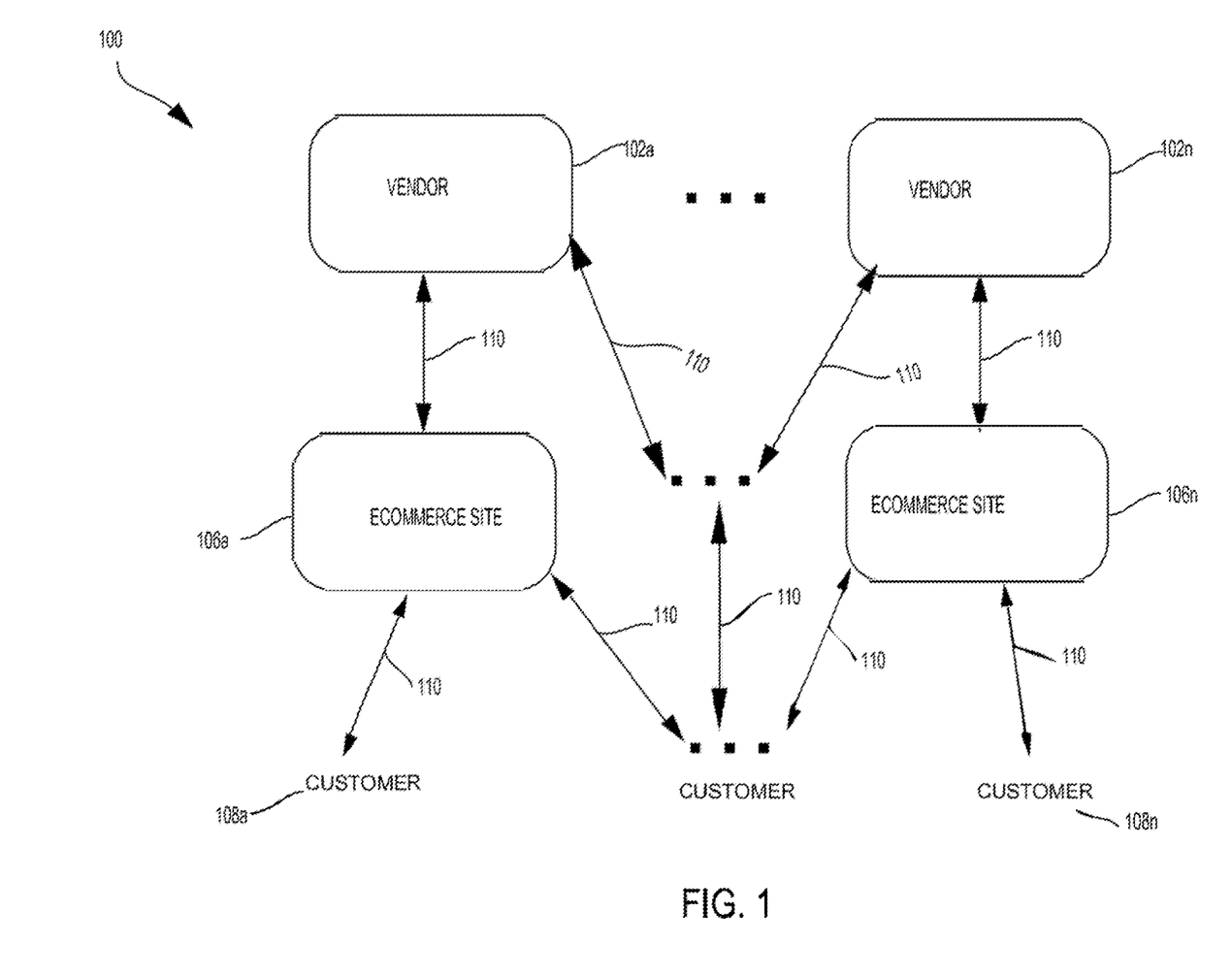
FIG. 1 illustrates an exemplary system of vendors, eCommerce player's site, and customers, according to one embodiment of the present disclosure.

As used herein, the "site" may refer to a physical site (e.g., a brick-and-mortar retail store) or an online website. FIG. 1 illustrates an exemplary system 100 of vendors, eCommerce sites, and customers, according to one embodiment of the present disclosure. As shown in the system 100, one or more vendors 102a . . . 102n may sell their products on one or more eCommerce sites 106a . . . 106n. The one or more vendors 102a . . . 102n may be independent of one another. The eCommerce sites 106a . . . 106n may be independent of one another. Customers 108a . . . 108n may independently purchase products from the one or more eCommerce sites. The customers, the eCommerce sites, and the vendors may communicate via communications channels 110. The communication channels may be any wireless-based and/or wired communications channels.

When a customer places an order for products from one of the eCommerce sites, the vendor whose products are ordered may send out an inventory transaction update to all the eCommerce sites, including the eCommerce site on which the order is placed. Many inventory transaction updates may be transmitted in a short period of time. Such inventory transaction update messages may be out of order during the transmission. For example, an old message may be received earlier than a newer message from an eCommerce site, thus, the eCommerce site may not receive a proper message sequence. In addition, the vendor may rebroadcast the same message during a specified time of period to ensure all the eCommerce sites receive the message. This may result in duplicate messages being received by the eCommerce sites. The above problems may lead to the inefficiency of message processing, and waste of computing resources. The systems and methods disclosed herein may overcome the above problems.

Some embodiments of the present disclosure may be capable of handling inventory transactions between vendors and eCommerce sites, for example, updating item inventory of the vendors across the eCommerce sites. Such handling may include detecting an inventory feed which has been published out-of-sequence due to transmission delay across systems. As used herein, the inventory feed may include any updating or change information on the inventory items from the vendors. For example, stock keeping unit (SKU) of inventory items may be included in the inventory feed, along with quantity and timestamps of the inventory items. The handling may further include detecting inventory feed which has been published repeatedly without any change. For example, an inventory feed may simply include inventory items and related information without any changes made to the items.

In some embodiments of the present disclosure, systems, methods, and computer-readable storage media configured according to this disclosure may be capable of scaling horizontally in terms of growth of the vendors transaction volume along with detection of inventory rebroadcast from suppliers or sellers. For example, the system may be scaled to handle inventory transaction interactions with a continued growth of a number of vendors who offer their products on multiple eCommerce sites.

Various specific embodiments of the disclosure are described in detail below. While specific implementations are described, it should be understood that this is done for illustration purposes only. Other components and configurations may be used without parting from the spirit and scope of the disclosure, and can be implemented in combinations of the variations provided. These variations shall be described herein as the various embodiments are set forth.

Figure 2:
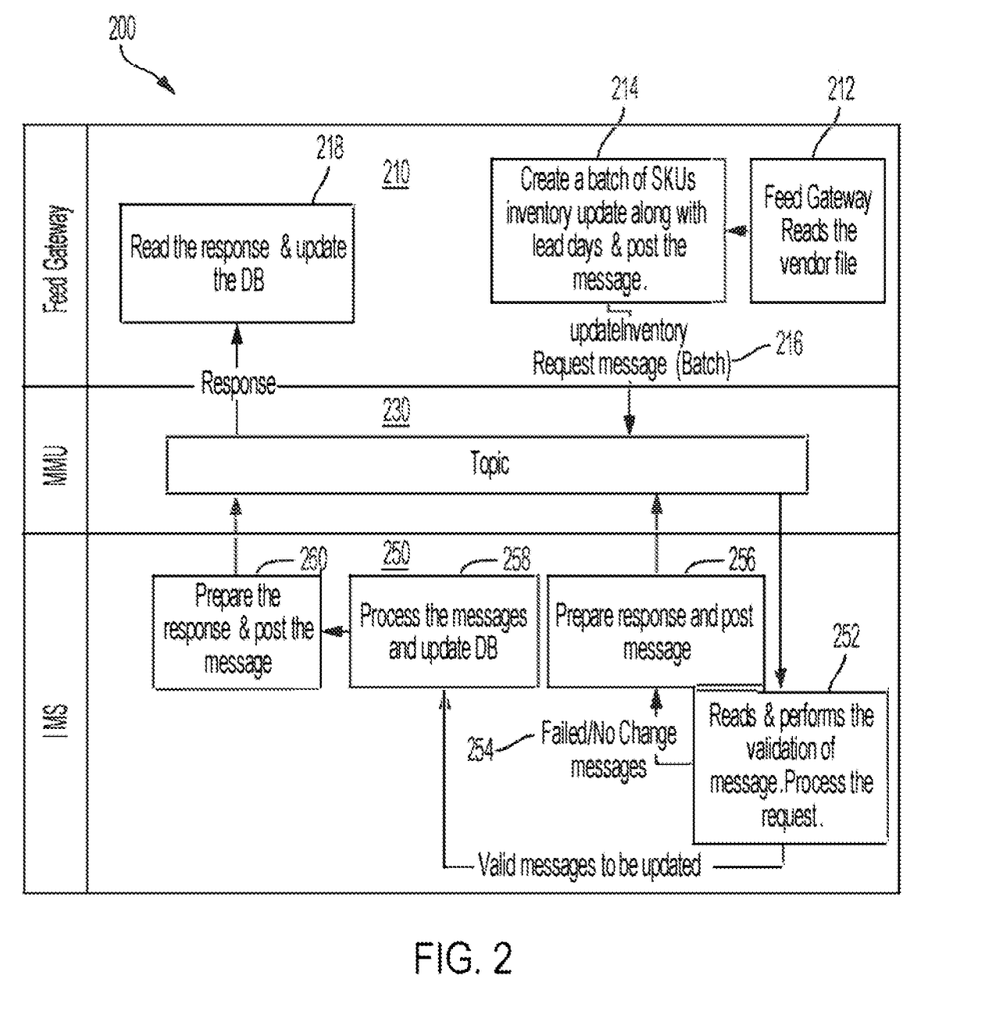
FIG. 2 illustrates an exemplary system of updating vendors inventory on a eCommerce player's site, according to one embodiment of the present disclosure.

FIG. 2 illustrates an exemplary system 200 for updating vendors' inventory on an eCommerce site, according to one embodiment of the present disclosure. The system 200 may comprise a feed gateway 210, a message management unit (MMU) 230, and an inventory management system (IMS) unit 250. The system 200 may further comprise one or more wired or wireless communication networks through which the feed gateway 210, the MMU 230, and the IMS 250 can communicate with each other.

The feed gateway 210, the MMU 230, and the IMS unit 250, may each comprise computing hardware, computing software, or a combination thereof to implement the desired functions and features. In addition, the feed gateway 210, the MMU 230, and the IMS unit 250 may embody a server cluster with each of the feed gateway 210, the MMU 230, and the IMS unit 250 operates on one server. The feed gateway 210, the MMU 230, and the IMS unit 250 may embody a cloud computing environment. Further, a portion or whole of the system 200 may be configured to operate by different parties. For example, the feed gateway 210 may be operated by one or more vendors, the IMS 250 may be operated by an eCommerce player who sells different products of the one or more vendors, and the MMU 230 may be a cloud computing device.

The feed gateway 210 may be configured to receive an electronic data feed, such as a feed inventory file 212 (also referred to as a vendor file). The feed inventory file 212 may be provided by the vendor, and may comprise any information related to inventory updates and changes, such as item name, item identification (ID), item quantity, item status (e.g., in stock or out of stock), timestamp indicating when the inventory information is updated or changed, lead days of the item, item distributor identifier, etc. The item ID may be any identification to identify an item of the vendor's inventory, and may vary based on different vendors. For example, the item ID may comprise SKUs, universal product codes (UPCs), or a combination thereof. The lead days may refer to the number of days required for an item to be shipped from a vendor to a purchaser of the item. The lead days may include the time required to ship the item from the vendor to the eCommerce site and from the eCommerce site to the purchaser. The lead days may be an exact number (e.g., 5 business days) or a range (e.g., from 5 to 7 business days).

The feed gateway 210 may create, based on the feed inventory file 212, a feed message 214. The feed message 214 may include a batch of inventory messages having a batch identification (ID). The batch ID can be an identifier used for all the communications between the feed gateway 210, the MMU 230, and the IMS unit 250. Each of the inventory messages may correspond to one SKU of a batch of SKUs. The inventory message corresponding to the one SKU may include inventory update information of the SKU and lead days of the SKU. The batch of inventory messages may further have a specified batch size, for example, 2000 inventory messages.

The feed message 214 may be created based on one feed inventory file, or may be based on more than one feed inventory file. For example, if a feed inventory file includes information on less than a specified batch size (e.g., 1000 inventory messages), the feed message 214 may be generated based on more than one feed inventory files for improving system performance. Likewise, if a feed inventory file includes information on greater than a specified batch size (e.g., greater than 2000 inventory messages), the feed message 214 may be generated based on a portion of the feed inventory file.

The feed gateway 210 may publish (216) or post the feed message 214 to the MMU 230. The publishing may be done by a command (e.g., updateInventory Request message) calling the MMU via an application programming interface (API).

The feed gateway 210 may further process (218) responses received from the MMU 230, which will be described later in more details. For example, the feed gateway 210 may read the responses and update its database based on the responses.

The MMU 230 may embody any messaging management module, message queue, or application. For example, the MMU 230 may be a message streaming platform that is configured to publish and subscribe to streams of message records, store streams of message records in a fault-tolerant durable way, and process streams of message records as they occur. The MMU 230 may be configured to construct real-time streaming data pipelines that reliably get data between systems or applications.

In some embodiments, the MMU 230 may run as a cluster on one or more servers that may span multiple datacenters. The MMU 230 may be configured to store streams of message records in categories that may be referred to as topics. Each record may comprise a key, a value, and a timestamp. The MMU 230 may have APIs that allows to publish a stream of message records to one or more topics. The MMU 230 may also have APIs that allows to subscribe to one or more topics. The MMU 230 may further be configured to consume an input stream from one or more topics and produce an output stream to one or more output topics.

The MMU 230 may be configured to receive the feed message 214 from the feed gateway 210, and place the feed message 214 in a message queue of the MMU 230. The MMU 230 may further be configured to send the feed message 214 from the message queue to the IMS unit 250.

The IMS unit 250 may receive or pull the feed message 214 from the message queue of the MMU 230. The inventory messages (block 252) may then be validated. The validation may also compare the information in the inventory message with the information stored in a database of the IMS 250. For example, SKUs, UPCs, item names, item quantity, timestamp of inventory change, etc. may be compared to determine if the information is changed. A "valid message" may be an inventory message that includes proper and changed information from the information stored on the IMS 250. The validation may also check that the message is in the proper format and includes any required fields.

For example, if an inventory message is identified to include unchanged information compared to the information stored on the IMS 250, this inventory message may be categorized as a duplicate message (i.e., a message with no change). If an inventory message is identified to include improper information, this inventory message may be categorized as a failed message. Examples of the failed inventory messages may include inventory messages with old timestamps, invalid offer, or offer shipping information that does not exist.

The failed and no-change messages are referred to as invalid inventory message 254 that may be grouped into a batch by the IMS 250. The batch may have a same batch ID as the corresponding feed message 214. A response to each of the invalid inventory messages may be generated by the IMS 250. Those responses may be batched as a batch message 256 and may be published to the message queue in the MMU 230. After receiving the batch message 256, the MMU 230 may push the batch message 256 to the feed gateway 210, or the feed gateway may subscribe to the batch message 256.

The response to the invalid inventory message may include information why the message is not proper. This information may be a status code, a category description, an action to be taken, or impact if the action is non taken in prescribed way. The status code may indicate a status of an inventory message, for example, "data error." The category description may detail the data error, for example, "the inventory message has an old timestamp." The action to be taken may refer to what action is required for the inventory message, for example, "no retry needed." The impact if the action is not taken in prescribed way may refer to an impact if the data error is not handled by the action to be taken, for example, "if same batch is retried again then it will be rejected again."

The valid inventory messages are processed by the IMS 250 and a database of the IMS 250 may be updated based on the valid inventory messages (block 258). The IMS 250 may generate a response with a confirmation (e.g., success) to each of the valid inventory messages (block 260). The response messages may be grouped into a batch of response messages 260 by the IMS 250. The batch of response messages 260 may have a same batch ID as the corresponding feed message 214. The response to each of inventory messages that are validated may include what actions have been performed based on the valid inventory message. Those responses as a batch of message may be published to the message queue in the MMU 230. After receiving the batch of response message 260, the MMU 230 may push the batch of response message 260 to the feed gateway 210, or the feed gateway 210 may subscribe to the batch of response message 260.

When the feed gateway 210 receives the batch of response message 256 including responses to the invalidated inventory messages from the MMU and the batch of response message 260 including responses to the validated inventory messages from the MMU 230, the feed gateway 210 may update a database of the feed gateway 210 based on the batch of response message 256 and the batch of response messages 260 (block 218). For example, when an inventory message is identified as including invalid attribute, the response to this inventory message may including correcting the invalid attribute in feed at the feed gateway 210. If corrections are done at the feed gateway 210, then the feed gateway 210 may ensure that latest inventory of those SKU is taken with latest timestamp before retrying the batch of invalid inventory messages.

In some embodiments, the feed gateway 210 may be further configured to send the batch of response messages 256 and the batch of response messages 260 to the vendor. For example, some actions (e.g., correcting errors in an invalid inventory message) included in the response to an invalid inventory message may be performed by the vendor. If corrections are made by the vendor, then the vendor timestamp should be current with most recent inventory information for SKU. The corrected inventory messages may be re-submitted by the vendor.

In some embodiments, at any point during the backend processing (IMS processing) if an exception (i.e., a system error) is encountered, the system may try to address the system errors a specified of times. If the system error cannot be addressed after several attempts, the complete transaction may need to be rolled back.

For example, the IMS 250 may retry multiple times to correct any system errors internally before throwing this exception back as response to the feed gateway 210. The feed gateway 210 may retry only those records in a batch which failed with system error. The feed gateway 210 may maintain the same feed timestamp as earlier. If it is not possible for the feed gateway 210 to retry only failed records with system errors, then update for these SKUs may be sent by the vendor with latest supply and timestamp information in the next feed. If nothing is performed with respect to the system errors, then the old supply information may be overridden by the latest supply information.

Figure 3:
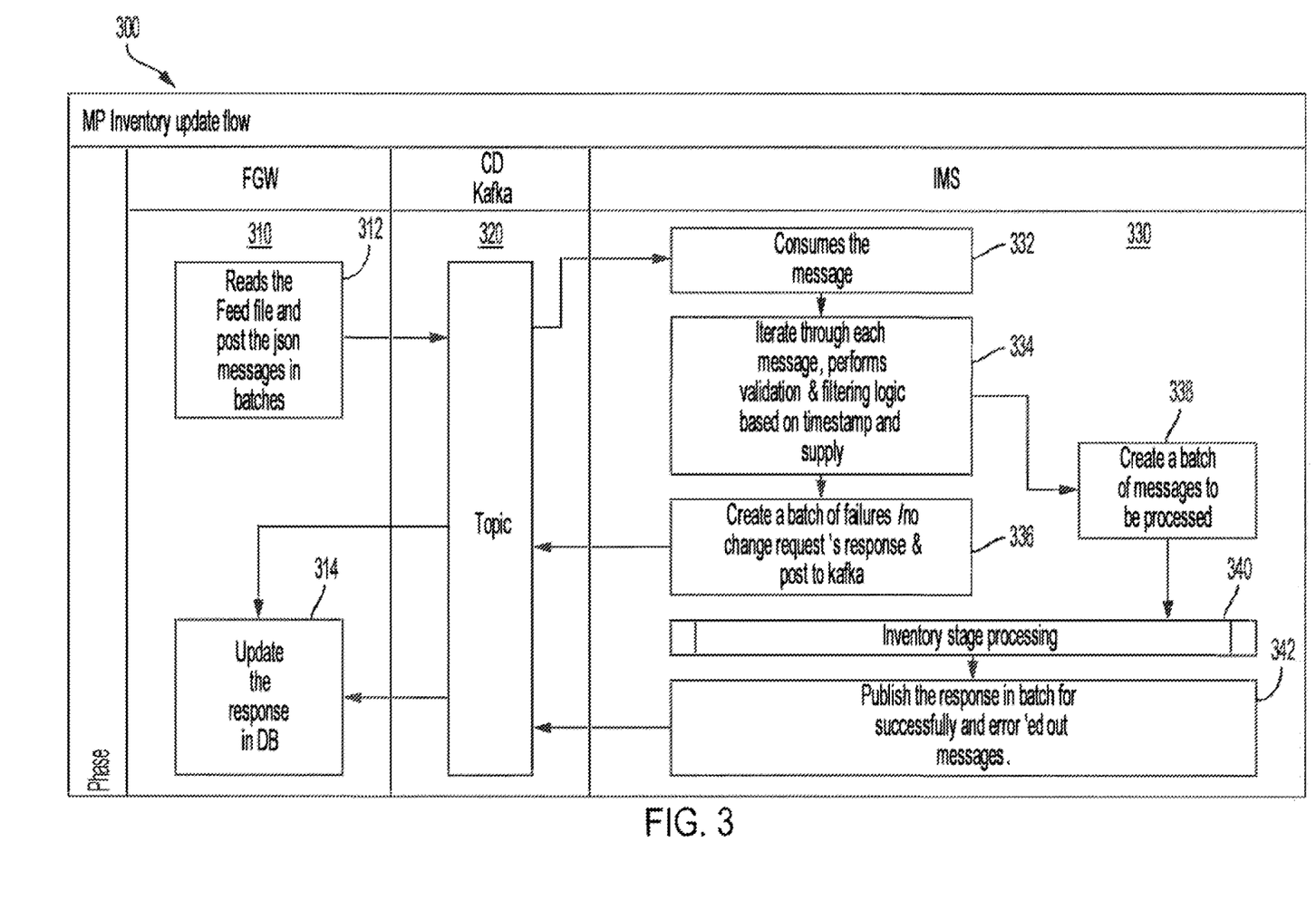
FIG. 3 illustrates another exemplary system of updating vendors inventory on a eCommerce player's site, according to one embodiment of the present disclosure.

FIG. 3 illustrates another exemplary system 300 according to an embodiment of the present disclosure. Some functions and features of the system 300 may overlap with the functions and features of the system 200 shown in FIG. 2. Thus some details may be referred to in the description of the system 200. The system 300 may comprise a feed gateway 310, a MMU 320, which may be CD Kafka platform, and an IMS unit 330. The system 300 may further comprise one or more wired or wireless communication networks through which the feed gateway 310, the MMU 320, and the IMS 330 can communicate with each other.

The feed gateway 310, the MMU 320, and the IMS unit 330, may each comprise computing hardware, computing software, or a combination thereof to implement the desired functions and features. In addition, the feed gateway 310, the MMU 320, and the IMS unit 330 may embody a server cluster with each of the feed gateway 310, the MMU 320, and the IMS unit 330 operates on one server. The feed gateway 310, the MMU 320, and the IMS unit 330 may embody a cloud computing environment. Further, a portion or whole of the system 300 may be configured to operate by different parties. For example, the feed gateway 310 may be operated by one or more vendors, the IMS 330 may be operated by an eCommerce site who sells products of the one or more vendors, and the MMU 320 may be a cloud computing device.

The feed gateway 310 may be configured to receive a feed file (block 312). The feed file 312 may be provided by the vendor, and may comprise any information related to inventory updates and changes, such as item name, item identification (ID), item quantity, item status (e.g., in stock or out of stock), timestamp indicating when the item is updated or changed, lead days of the item, etc.

The feed gateway 310 may create, based on the feed file, Java script object notion (JSON) messages in a batch having a batch identification (ID). Each of the JSON messages may correspond to one SKU of a batch of SKUs in the feed file. The JSON message corresponding to the SKU may include inventory update information of the SKU and lead days of the SKU. The batch of JSON messages may further have a specified batch size, for example, 1000 inventory messages.

The feed gateway 310 may publish or post the JSON messages to the MMU (CD Kafka) 320. The publishing may be done by a command calling the MMU via an application programming interface (API).

The MMU 320 may be configured to place the JSON messages in a message queue of the MMU 320. The MMU 320 may be configured to store streams of message records in categories that may be referred to as topics. Each record may comprise a key, a value, and a timestamp. The MMU 320 may further be configured to send the JSON messages from the message queue to the IMS unit 320 upon subscription by the IMS unit 320.

The IMS unit 330 may be configured to consume the JSON messages (block 332) received from the message queue of the MMU 320. The IMS may iterate each of the JSON messages, and perform validation and filtering based on timestamp and product supply information contained in the JSON message, details of which are provided in the above description of the system 200.

The IMS unit 330 may generate responses to failures/no change requests. The responses may be batched and pushed to the message queue of the MMU 320 (block 336). The batch of responses to the failures/no change requests may have a batch ID same as the batch ID of the batch of JSON messages. The definition of the failures/no change requests may refer to the definition in the description of the system 200.

The batch of responses to the failures/no change requests, may include, but are not limited to, a status code, a category description, an action to be taken, and impact if the action is on taken in prescribed way.

Via the iteration of the JSON messages, a batch of valid JSON messages may be created (block 338). The valid JSON messages may then be processed by the IMS 330 (block 340) and a database of the IMS 330 may be updated based on the batch of valid JSON messages. For example, an inventory of products is updated in the database to reflect the transacted inventory.

The IMS 330 may generate responses to the valid JSON messages (block 342). The responses may be batched and pushed to the message queue of the MMU 320 (block 342). The batch of responses to the valid JSON messages may have a batch ID same as the batch ID of the batch of JSON messages. The response to each of the valid JSON messages may include what actions have been performed based on the valid JSON message. Those responses as a batch message may be published to the message queue in the MMU 330. After receiving the batch message, the MMU 330 may push the batch message to the feed gateway 310, or the feed gateway 310 may subscribe to the batch of responses.

When the feed gateway 310 receives the batch of responses to the failure/no change requests and the batch of responses to the valid JSON messages, the feed gateway 310 may update a database of the feed gateway 310 based on the two batches of responses (block 314).

Figure 4:
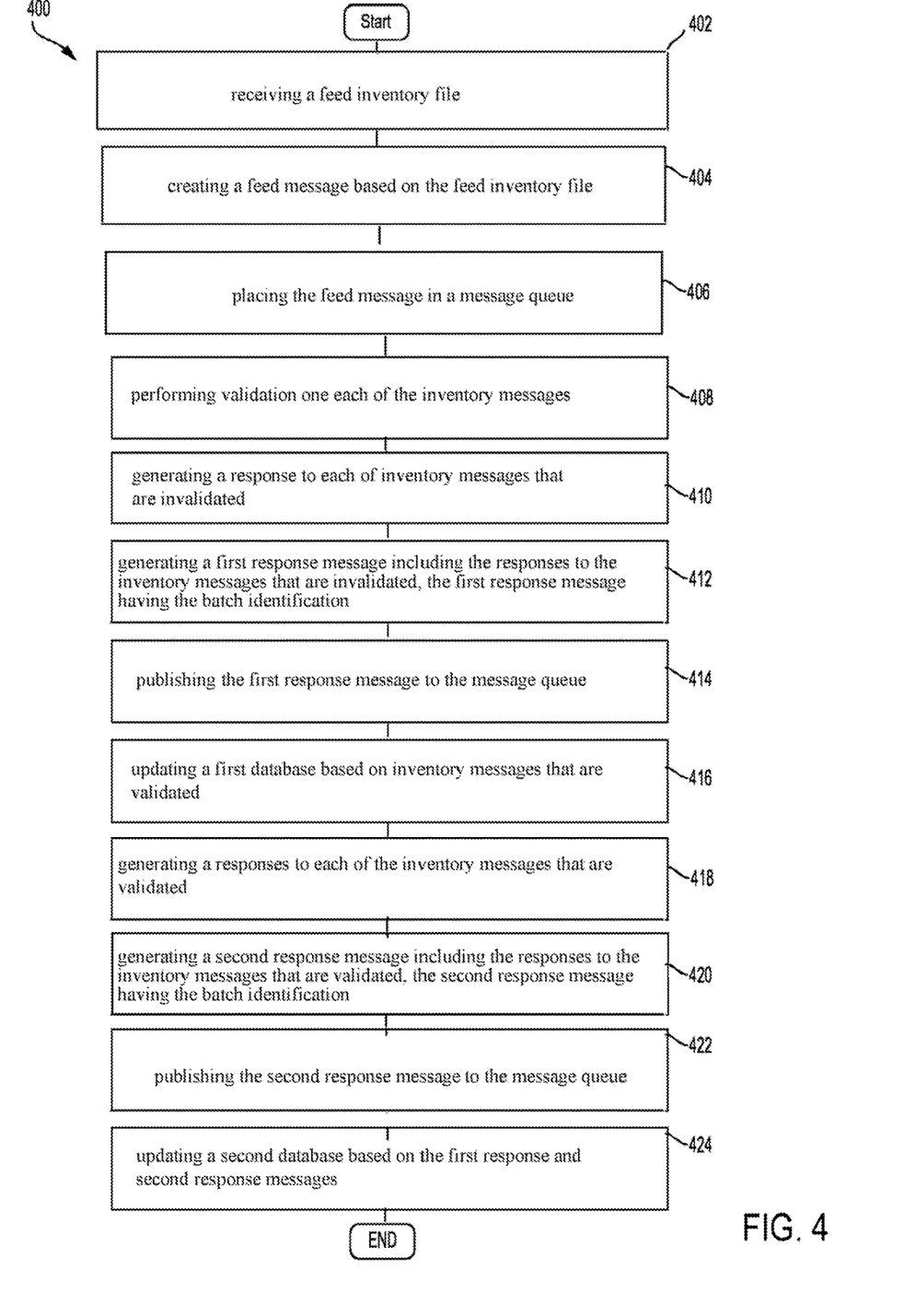
FIG. 4 illustrate an exemplary method of updating vendors inventory on a eCommerce player's site, according to one embodiment of the present disclosure.

FIG. 4 illustrates an exemplary method 400 of anomaly detection and deduplication of electronic data feeds, according to one embodiment of the present disclosure. The method 400 may be implemented in the above disclosed systems, may include the following steps, and thus some details may not be repeated herein.

At step 402, an electronic feed inventory file is received. The feed inventory file may be received from a vendor. The feed inventory file may include records comprising item name, item identification (ID), item quantity, item status, item distributor identifier, timestamp indicating when the item is updated or changed, or lead days of the item.

At step 404, a feed message may be generated based on the feed inventory file. The feed message may include a batch of inventory messages having a batch identification. Each of the inventory messages may correspond to a SKU of a batch of SKUs. The inventory message corresponding to one SKU may include inventory update information of the one SKU and lead days of the one SKU.

At step 406, the feed message may be placed in a message queue. The messages in the queue may be categorized as topics.

At step 408, validation of each inventory message is performed. Each of the inventory messages may be iterated to be categorized as an invalidated inventory message or a validated inventory message, details of which may be referred to the descriptions of the above systems. For example, an invalidated inventory message may include invalid item or node messages along with items which do not have inventory supply change in a batch having same batch ID. Herein, the node may refer to a distributor identifier (e.g., an ID associated to location when inventory is stocked.)

At step 410, a response to each of inventory messages that are invalidated may be generated. The response may include status code, what actions need to be taken for correcting errors, etc. as described before.

At step 412, a first response message including the responses to the inventory messages that are invalidated may be generated. The first response message may be assigned a batch ID same as the ID of the feed batch message.

At step 414, the first response message may be published to the message queue.

At step 416, a first database may be updated based on inventory messages that are validated. The validated inventory messages are processed according to information contained in the validated inventory messages to update the first database, for example, an inventory database.

At step 418, a responses to each of the inventory messages that are validated may be generated. The response may include information indicating that what actions have been performed based on the invalidated inventory messages.

At step 420, the responses to the validated inventory messages may be grouped into a second response batch message. The second response batch message may be assigned a batch ID same as the ID of the feed batch message.

At step 422, the second response batch message may be published to the message queue.

At step 424, a second database may be updated based on the first response and second response batch messages. The second database may be a database recording what responses to the inventory messages have been performed.

The method 400 may further comprise sending the first response and second response batch messages to the vendor. The vendor may be requested to perform some actions based on the first response and second response batch messages, for example, correcting some errors contained in the inventory messages, resubmitting inventory messages, updating the vendor's database, etc.

A non-transitory computer-readable storage medium may also be provided having instructions stored which, when executed by a computing device, may cause the computing device to perform operations comprising: receiving a feed inventory file; creating a feed message based on the feed inventory file, wherein: the feed message includes a batch of inventory messages having a batch identification; each of the inventory messages corresponds to one SKU of a batch of SKUs; and the inventory message corresponding to the one SKU includes inventory update information of the one SKU and lead days of the one SKU; placing the feed message in a message queue; performing validation one each of the inventory messages; generating a response to each of inventory messages that are invalidated; generating a first response message including the responses to the inventory messages that are invalidated, the first response message having the batch identification; publishing the first response message to the message queue; updating a first database based on inventory messages that are validated; generating a responses to each of the inventory messages that are validated; generating a second response message including the responses to the inventory messages that are validated, the second response message having the batch identification;

publishing the second response message to the message queue; and updating a second database based on the first response and second response messages. The non-transitory computer-readable storage medium having instructions stored which, when executed by a computing device, may cause the computing device to perform further operations as descripted in the above systems and method.

Figure 5:
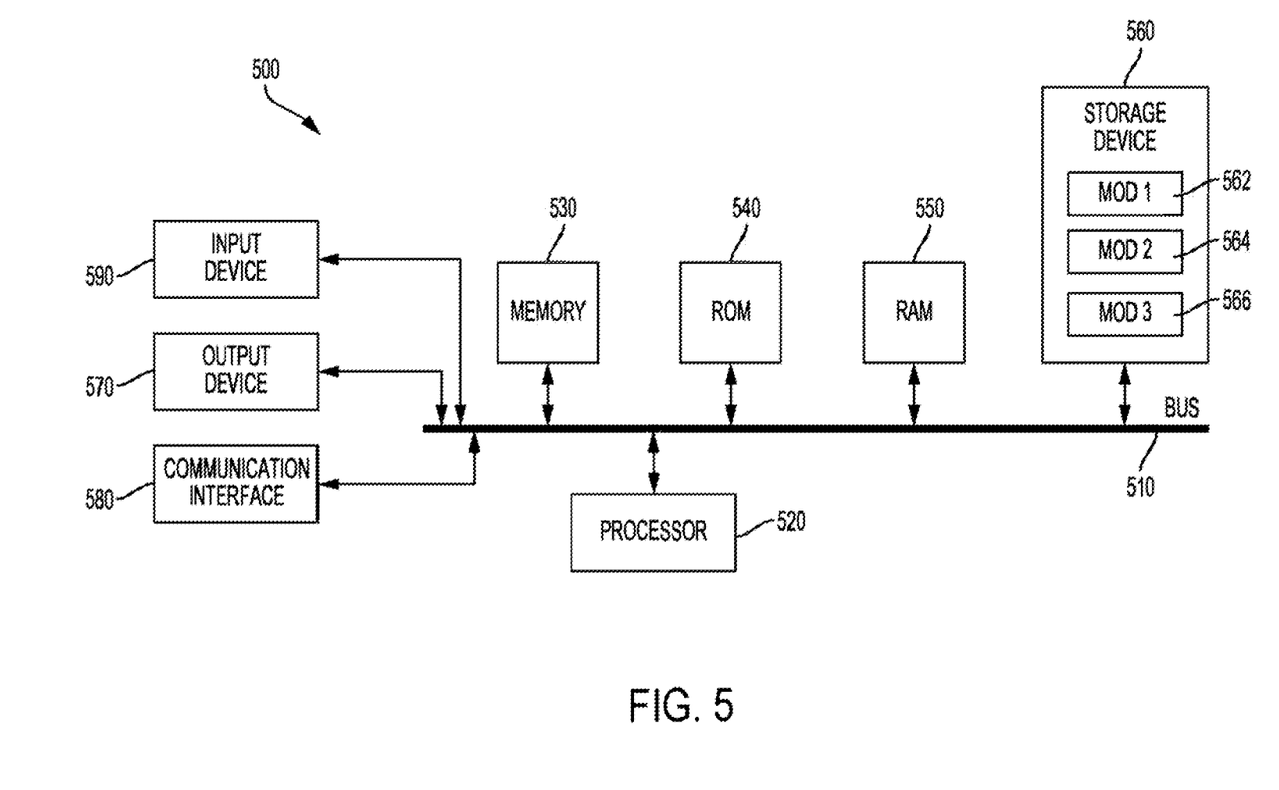
FIG. 5 illustrates an exemplary computer system that may be used to comprise the above systems in FIGS. 1-3, and to perform the method of FIG. 4.

FIG. 5 illustrates an exemplary computer system 500 that may be used to comprise the above systems in FIGS. 1-3, and to perform the method of FIG. 4. With reference to FIG. 5, the exemplary system 500 can include a processing unit (CPU or processor) 520 and a system bus 510 that couples various system components including the system memory 530 such as read only memory (ROM) 540 and random access memory (RAM) 550 to the processor 520. The system 500 can include a cache of high speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing system 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing system 500, such as during start-up. The computing system 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing system 500. In one aspect, a hardware module that performs a particular function includes the software component stored in a tangible computer-readable storage medium in connection with the necessary hardware components, such as the processor 520, bus 510, output device 570 as display, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the system 500 is a small, handheld computing device, a desktop computer, or a computer server.

Although the exemplary embodiment described herein employs the hard disk as the storage device 560, other types of computer-readable media which can store data that are accessible by a computer, such as magnetic cassettes, flash memory cards, digital versatile disks, cartridges, random access memories (RAMs) 550, and read only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing system 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing system 500. The communications interface 580 generally governs and manages the user input and system output. There is no restriction on operating on any particular hardware arrangement and therefore the basic features here may easily be substituted for improved hardware or firmware arrangements as they are developed.

The concepts disclosed herein can also be used to improve the computing systems which are performing, or enabling the performance, of the disclosed concepts. For example, by detecting the failure and no change inventory request messages, further processing of such invalided inventory messages can be prevented, thus significantly reducing computing resources consumption. Further, by returning those invalidated inventory messages back to the vendor, rebroadcasting of such invalidated inventory messages is inhibited, therefore significantly increasing processing efficiency of inventory updating requests.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system, comprising
a non-transitory memory; and
at least one processor operated to implement a feed gateway, a messaging management unit (MMU), and an inventory management system (IMS) unit, wherein the processor is operated to:
receive, by the feed gateway, an electronic feed inventory file;
create, by the feed gateway and based on the electronic feed inventory file, a feed message, wherein:
the feed message includes a batch of inventory messages having a batch identification; and
each of the inventory messages corresponds to one stock keeping unit (SKU) of a batch of SKUs and includes at least one of: (i) inventory update information of the one SKU and (ii) lead days of the one SKU;

publish the feed message to the MMU;
receive, by the MMU, the feed message from the feed gateway;
place, by the MMU, the feed message from the feed gateway;
receive, by the IMS unit, the feed message from a queue of the MMU;
validate, by the IMS unit, the inventory messages by comparing each SKU in the batch of SKUs to information stored in a database of the IMS unit;
generate, by the IMS unit, a first and a second batch of response messages, the first batch characterizing inventory messages that are invalidated and include an invalid attribute, and the second batch characterizing inventory messages that are validated;
receive, by the feed gateway, the first batch of response messages from the MMU;
correcting, by the feed gateway, the invalid attribute of at least one of the inventory messages in the first batch of response messages by obtaining a most recent inventory of SKUs with the latest timestamps and comparing the at least one inventory message to the most recent inventory of SKUs;
receive, by the feed gateway, the second batch of response messages from the MMU characterizing inventory messages that are validated; and
update, by the processor, a database based on the at least one of the inventory messages including the corrected invalid attribute and the second batch of response messages.

2. The system of claim 1, wherein the first batch of response messages identify inventory messages that are invalidated.

3. The system of claim 2, wherein the first batch of response messages include error codes associated with the inventory messages that are invalidated.

4. The system of claim 1, wherein the second batch of response messages identify inventory messages that are validated.

5. The system of claim 1, wherein the first batch of response messages and the second batch of response messages include the batch identification.

6. The system of claim 1, wherein the feed inventory file includes item name, item identification (ID), item quantity, item status, timestamp indicating when the item is updated or changed, or lead days of the item.

7. The system of claim 1, wherein the feed inventory file is received from a vendor.

8. The system of claim 7, wherein the feed gateway is further operated to send at least one of the first batch of response messages and the second batch of response messages to the vendor.

9. The system of claim 8, wherein the at least one of the first batch of response messages and the second batch of response messages request the vendor to perform at least one action.

10. The system of claim 9, wherein the at least one action is at least one of: (i) correcting errors contained in the inventory messages; (ii) resubmitting the inventory messages; and (iii) updating the vendor's database.

11. A method, comprising:
receiving, by a feed gateway, an electronic feed inventory file;
creating, by the feed gateway and based on the electronic feed inventory file, a feed message, wherein:
the feed message includes a batch of inventory messages having a batch identification; and
each of the inventory messages corresponds to one stock keeping unit (SKU) of a batch of SKUs and includes at least one of: (i) inventory update information of the one SKU and (ii) lead days of the one SKU;
publishing the feed message to a messaging unit (MMU);
receiving, by the MMU, the feed message from the feed gateway;
placing, by the MMU, the feed message from the feed gateway;
receiving, by an inventory management system (IMS) unit, the feed message from a queue of the MMU;
validate, by the IMS unit, the inventory messages by comparing, each SKU in the batch of SKUs to information stored in a database of the IMS unit;
generating, by the IMS unit, a first and a second batch of response messages, the first batch characterizing inventory messages that are invalidated and include an invalid attribute, and the second batch characterizing inventory messages that are validated;
receiving, by the feed gateway, the first batch of response messages from the MMU;
correcting, by the feed gateway, by the feed gateway, of at least one of the inventory messages in the first batch of response messages by obtaining a most recent inventory of SKUs with the latest timestamps and comparing the at least one inventory message to the most recent inventory of SKUs;
receiving, by the feed gateway, the second batch of response messages from the MMU characterizing inventory messages that are validated; and
updating, by a processor, a database based on the at least one of the inventory messages including the corrected invalid attribute and the second batch of response messages.

12. The method of claim 11, wherein:
the first batch of response messages identify inventory messages that are invalidated and include error codes associated with the inventory messages that are invalidated; and
the second batch of response messages identify inventory messages that are validated.

13. The method of claim 11, wherein the first batch of response messages and the second batch of response messages include the batch identification.

14. The method of claim 11, wherein the feed inventory file includes item name, item identification (ID), item quantity, item status, timestamp indicating when the item is updated or changed, or lead days of the item.

15. The method of claim 11, wherein the feed inventory file is received from a vendor.

16. The method of claim 15, comprising sending the at least one of the first batch of response messages and the second batch of response messages to the vendor.

17. The method of claim 16, wherein the at least one of the first batch of response messages and the second batch of response messages request the vendor to perform at least one action.

18. The method of claim 17, wherein the at least one action is at least one of: (i) correcting errors contained in the inventory messages; (ii) resubmitting the inventory messages; and (iii) updating the vendor's database.

19. A non-transitory computer-readable storage medium having instructions stored which, when executed by a computing device, cause the computing device to perform operations comprising:

receiving, by a feed gateway, an electronic feed inventory file;

creating, by the feed gateway and based on the electronic feed inventory file, a feed message, wherein:
- the feed message includes a batch of inventory messages having a batch identification; and
- each of the inventory messages corresponds to one stock keeping unit (SKU) of a batch of SKUs and includes at least one of: (i) inventory update information of the one SKU and (ii) lead days of the one SKU;

publishing the feed message to a messaging unit (MMU);

receiving, by the MMU, the feed message from the feed gateway;

placing, by the MMU, the feed message from the feed gateway;

receiving, by an inventory management system (IMS) unit, the feed message from a queue of the MMU;

validating, by the IMS unit, the inventory messages by comparing each SKU in the batch of SKUs to information stored in a database of the IMS unit;

generating, by the IMS unit, a first and a second batch of response messages, the first batch characterizing inventory messages that are invalidated and include an invalid attribute, and the second batch characterizing inventory messages that are validated;

receiving, by the feed gateway, the first batch of response messages from the MMU;

correcting, by the feed gateway, the invalid attribute of at least one of the inventory messages in the first batch of response messages by obtaining a most recent inventory of SKUs with the latest timestamps and comparing the at least one inventory message to the most recent inventory of SKUs;

receiving, by the feed gateway, the second batch of response messages from the MMU characterizing inventory messages that are validated; and updating, by a processor, a database based on the at least one of the inventory messages including the corrected invalid attribute and the second batch of response messages.

20. The non-transitory computer-readable storage medium of claim 19, the operations further comprising:

receiving the feed inventory file from a vendor;

sending the at least one of the first batch of response messages and the second batch of response messages to the vendor requesting the vendor to perform at least one action comprising at least one of: (i) correcting errors contained in the inventory messages; (ii) resubmitting the inventory messages; and (iii) updating the vendor's database.

* * * * *